(12) United States Patent
Cruickshank

(10) Patent No.: US 9,664,307 B2
(45) Date of Patent: May 30, 2017

(54) IMPROVEMENTS RELATING TO ABANDONMENT AND RECOVERY OF PIPELINES

(71) Applicant: Subsea 7 Limited, Sutton (GB)

(72) Inventor: John Duncan Cruickshank, Woodlands of Durris (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 14/766,128

(22) PCT Filed: Feb. 6, 2014

(86) PCT No.: PCT/GB2014/050335
§ 371 (c)(1),
(2) Date: Aug. 5, 2015

(87) PCT Pub. No.: WO2014/122457
PCT Pub. Date: Aug. 14, 2014

(65) Prior Publication Data
US 2015/0377385 A1    Dec. 31, 2015

(30) Foreign Application Priority Data

Feb. 6, 2013 (GB) .................................... 1302115.9

(51) Int. Cl.
*F16L 1/12* (2006.01)
*F16L 1/235* (2006.01)
(Continued)

(52) U.S. Cl.
CPC ................. *F16L 1/235* (2013.01); *F16L 1/14* (2013.01); *F16L 1/161* (2013.01); *F16L 1/166* (2013.01);
(Continued)

(58) Field of Classification Search
CPC .............. F16L 1/166; F16L 1/19; F16L 1/235
(Continued)

(56) References Cited

U.S. PATENT DOCUMENTS

| 3,957,112 A | 5/1976 | Knibbe et al. |
| 4,073,157 A | 2/1978 | Aylmer et al. |

(Continued)

FOREIGN PATENT DOCUMENTS

| EP | 1 850 043 | 10/2007 |
| FR | 1 471 134 | 2/1967 |

(Continued)

*Primary Examiner* — Sunil Singh
(74) *Attorney, Agent, or Firm* — Levy & Grandinetti

(57) ABSTRACT

A method of abandoning a pipeline during subsea pipelaying from a pipelay vessel includes suspending the pipe string from a tendon element of an abandonment string and engaging further tendon elements to an upper end of the abandonment string while lowering the pipe string to a handover depth. At the handover depth, tension is applied via a wire to the top of the pipe string at an acute angle to the launch axis. This deflects the pipe string from the launch axis into axial alignment with the wire to transfer the weight load of the pipe string to the wire, whereupon the abandonment string can be decoupled from the pipe string. Recovery of the pipeline from the seabed can be effected by a reverse process.

13 Claims, 11 Drawing Sheets

(51) Int. Cl.
*F16L 1/14* (2006.01)
*F16L 1/16* (2006.01)
*F16L 1/20* (2006.01)
*F16L 1/19* (2006.01)
*F16L 1/23* (2006.01)
*F16L 1/26* (2006.01)

(52) U.S. Cl.
CPC ............... *F16L 1/19* (2013.01); *F16L 1/202* (2013.01); *F16L 1/205* (2013.01); *F16L 1/207* (2013.01); *F16L 1/23* (2013.01); *F16L 1/26* (2013.01)

(58) Field of Classification Search
USPC .................................. 405/158, 166, 170, 173
See application file for complete search history.

(56) References Cited

U.S. PATENT DOCUMENTS

| | | | |
|---|---|---|---|
| 6,030,145 A | 2/2000 | Stewart, Jr. et al. | |
| 6,273,643 B1 | 8/2001 | Baugh | |
| 7,507,055 B2 | 3/2009 | Smith et al. | |
| 2003/0099515 A1 | 5/2003 | Giovannini et al. | |
| 2011/0123273 A1* | 5/2011 | Feijen | F16L 1/16 405/166 |
| 2011/0262229 A1* | 10/2011 | Tame | F16L 1/166 405/166 |

FOREIGN PATENT DOCUMENTS

| | | |
|---|---|---|
| GB | 1 277 364 | 6/1972 |
| GB | 2 335 448 | 9/1999 |
| GB | 2 434 627 | 8/2007 |
| GB | 2 463 286 | 3/2010 |
| GB | 2 476 823 | 7/2011 |
| GB | 2 488 767 | 9/2012 |
| WO | WO 2005/005874 | 1/2005 |
| WO | WO 2011/083340 | 7/2011 |
| WO | WO 2012/168702 | 12/2012 |

* cited by examiner

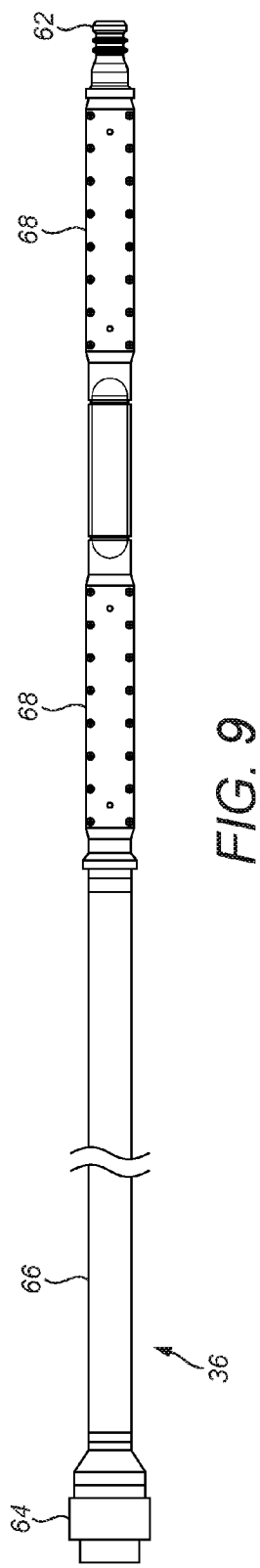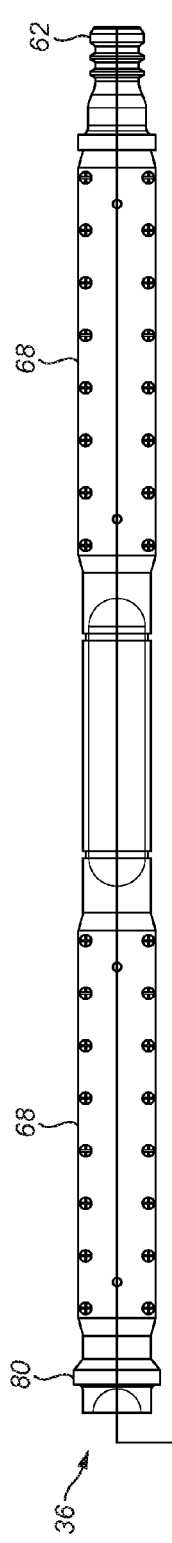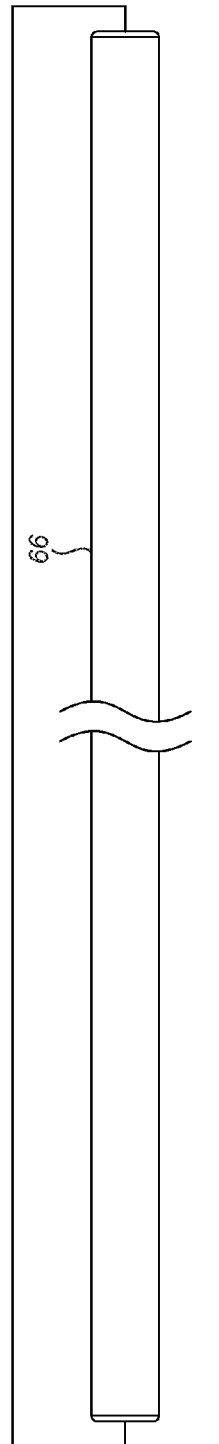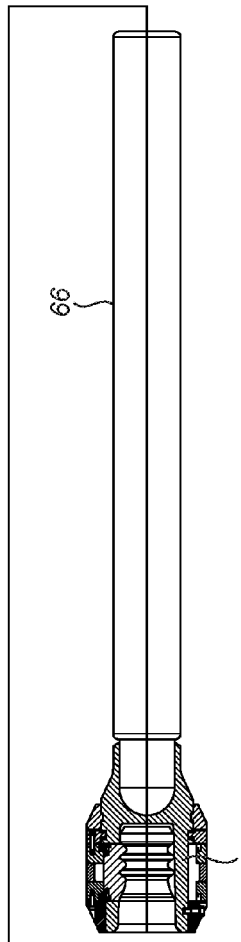
FIG. 9  FIG. 10

IMPROVEMENTS RELATING TO ABANDONMENT AND RECOVERY OF PIPELINES

This Application is the U.S. National Phase of International Application Number PCT/GB2014/050335 filed on Feb. 6, 2014, which claims priority to Great Britain Application No. 1302115.9 filed on Feb. 6, 2013.

BACKGROUND OF THE INVENTION (1) Field of the Invention

This invention relates to abandonment and recovery or 'A&R' procedures used in marine pipelaying, in which a floating vessel such as a barge is used to lay an offshore pipeline.

(2) Description of Related Art

The invention has particular advantages when used with J-lay pipelaying equipment and it will be described in that context.

The J-lay technique is suitable for pipelaying in deep water. It involves welding together successive pipe sections or 'joints' in an upright orientation in a J-lay tower on a pipelaying vessel. The resulting pipe string is launched downwardly into the water as it is formed. The pipe string adopts a single bend as it nears the seabed to lend a J-shape to the pipe string extending between the vessel and the seabed—hence 'J-lay'.

J-lay is necessary in deep water because the pipe string with attached accessories extending from the pipelaying vessel to the seabed is extremely heavy, typically weighing hundreds of tonnes. To avoid buckling, the pipe string must bear that weight in tension, suspended from a holding device on the J-lay tower.

An example of a J-lay pipelaying vessel is the Applicant's derrick lay barge Seven Polaris. The operation of Seven Polaris during pipelaying will now be outlined with reference to FIGS. 1 and 2 of the drawings. It should be noted that this example is given simply to put the invention into context and so does not limit the scope of the invention. In those drawings:

FIG. 1 is a side view of a J-Lay tower on a barge; and

FIG. 2 is a perspective view of an erector arm loading a double joint into the tower of FIG. 1.

Referring to FIGS. 1 and 2, the J-lay tower 10 of the barge 12 is supplied with double joints 14 of pipe made onshore, which are stored horizontally on the deck 16. As required, the double joints 14 are lifted successively in horizontal orientation from the deck 16 to a tower entry level 18 using a pipe elevator system 20 best shown in FIG. 2. Here, a double joint 14 is loaded into a pivoting erector arm 22, which upends the double joint 14 into an upright orientation and passes it over to a tower handling system comprising a tensioning apparatus including a travelling clamp 24. The double joint 14 is then lowered and aligned with the pipeline end held in a support bushing at a work station 26 on the tower 10.

The double joint 14 is welded to the pipeline end at the work station 26 before the load of the pipe string is transferred from the support bushing to the travelling clamp 24 near the top of the J-lay tower 10. The completed pipe string is then lowered down to the support bushing for the addition of the next double joint 14. The travelling clamp 24 and the support bushing alternate to grip the pipeline end, interacting in a so-called 'hand-over-hand' manner.

Abandonment and recovery refer, respectively, to the procedures of laying down a pipeline end on the seabed and later retrieving the pipeline end from the seabed. Those procedures are necessary during normal pipelaying start-up and termination. They are also necessary whenever pipelaying must be interrupted and resumed. For example, the pipelaying vessel may suffer a critical breakdown. More commonly, pipelaying is interrupted due to deteriorating weather conditions, which may stress the pipeline and reduce its fatigue life as the pipelaying vessel rolls and pitches in a rough sea or if it has difficulty remaining in position due to winds and currents. In such cases, the pipelaying vessel may need to abandon the pipeline end and leave the work area. When the problem that caused abandonment has passed, the vessel will return later to recover the pipeline end and resume pipelaying.

Abandonment involves attaching a cap to the pipeline end, which may be a pipeline end termination or PLET. A shackle is attached to a hook on the PLET to secure a wire running through a winch on the pipelaying vessel, and tension is transferred from the travelling clamp of the J-lay tower to the winch. The winch then lowers the PLET into the sea until the pipeline and PLET rest on the seabed. The wire is then detached from the hook of the PLET, for example using a remote-controlled linkage or an ROV, and is retracted by the vessel for storage.

A recovery buoy is attached to the PLET during abandonment, enabling the PLET and the pipeline end to be located and retrieved during a subsequent recovery procedure. In essence, the recovery procedure is the reverse of abandonment as the wire is reattached to the PLET, typically using an ROV, and the PLET with the attached pipeline end is winched back up to the pipelaying vessel for pipelaying to resume.

It may be possible in some situations for the pipelaying vessel to remain on station above the abandoned pipeline, for example while riding out a period of bad weather. In that case, the wire may be kept attached to the PLET resting on the seabed until the bad weather has passed. This eases the recovery procedure considerably.

Traction (capstan) winches are generally used in A&R procedures to handle the high top tensions characteristic of deep-water pipelaying. Such winches require a continuous length of wire, generally of steel. That wire must be of large diameter to support the great weight of the pipe string that extends above the seabed as the pipeline end nears the surface. Obviously, the wire must also be very long: generally several thousand meters long. Consequently, the wire itself may weigh in excess of 300 tonnes, and it takes up a great deal of space on the vessel when not in use.

Until recently, it was not possible to manufacture continuous lengths of wire of the necessary diameter. Indeed, A&R wires remain a high-cost item. They are also susceptible to damage, particularly in the corrosive marine environment, and so have a limited life. If damaged, the whole wire may have to be down-rated or rejected; this makes it advisable for the pipelaying vessel to carry a spare wire but this, of course, doubles the problems of high cost and storage space.

It has been proposed to use complete single lengths of synthetic rope with traction winches for A&R purposes but that technology is not yet fully proven. It is also noted that any damage to any part of a continuous rope may lead to the entire rope being down-rated or rejected, like a wire.

Of course, a heavy pipe string also requires a large, powerful and hence expensive winch. Exploitation of oil and gas reserves in ever-deeper water and the use of intrinsically heavier pipes such as pipe-in-pipe (PiP) systems could involve a top tension of as much as 1400 tonnes, by way of example. This is significantly above the load that can be handled by conventional J-Lay A&R systems as it considerably exceeds the capacity of a typical A&R winch. Unfortunately, limitations of cost and vessel space militate against merely scaling up an A&R winch in accordance with the higher load.

Multiple winch and wire systems have been proposed in an effort to mitigate these problems. An example is disclosed in U.S. Pat. No. 7,507,055 to Subsea 7. This recognises that A&R operations do not always take place at extremes of depth and that those operations can be handled more conveniently, where possible, with a smaller-capacity wire and winch than with a larger-capacity wire and winch. Consequently, pipelaying vessels are often equipped with both larger-capacity and smaller-capacity wires and winches.

These differently-rated wires and winches may be used together or successively. For example, when abandoning a pipeline, the larger-capacity wire and winch may be used to lower the pipeline end to an intermediate depth at which the top tension reduces to an extent that the load can be transferred to the smaller-capacity wire and winch. The higher-capacity wire can then be disconnected from the pipeline end and retracted to the pipelaying vessel. The smaller-capacity wire and winch then takes over to lower the pipeline end the rest of the way to the seabed. This means that a shorter length of larger-diameter wire is required on the drum of the higher-capacity winch, reducing space requirements and potentially also cost. However each wire remains vulnerable to damage and if spares are kept on board for both wires, the pipelaying vessel must accommodate four wires and not just two. This consumes space and reduces any cost advantage.

It has also been proposed in the prior art to effect abandonment and recovery by adding elements to, or removing elements from, an end of a pipe string using the same pipe-laying and tensioning apparatus that is used for laying the pipeline. To enable this, the elements may be of much the same general dimensions in terms of length and diameter as the ordinary lengths of pipe that make up the pipeline.

For example, US 2003/0099515 to Saipem proposes reducing the top tension of a sealine being laid by the vessel, this sealine being defined as pipeline laid on the seabed together with any pipeline or other elongate members extending upwardly from the pipeline. Tension is reduced by connecting one or more elongate members to the end of the pipeline and lowering the elongate members into the sea. These elongate members are lighter, length-for-length, when submerged in water, than the weight in water of the pipeline to which they are connected. Consequently, the effect is to reduce the apparent weight of the overall sealine.

WO 2005/005874 to Stolt Offshore proposes the use of rigid tubes such as drill pipe sections to lower and raise a pipeline during abandonment and recovery, the tubes being handled and connected by a J-lay system. The successive tubular sections may be screwed together by cooperating threads.

WO 2011/083340 to Subsea 7 proposes the use of elongate sling sections that are cooperable with like sling sections to form a sling for use in abandonment or recovery of a pipeline. Each sling section comprises complementary connector formations at opposite ends, such that each connector formation is cooperable with a complementary connector formation of a neighbouring sling section. Each sling section further comprises a tensile load-bearing sling element extending between the ends and a sleeve around the sling element that provides rigidity for the sling section and protection for the sling element.

GB 2488767 to Technip describes another way to abandon a pipeline, in that case using a continuous flexible pipe as a sling. Flexible pipe is an expensive solution and as a storage reel is necessary, flexible pipe may be difficult to store on a vessel that is configured for laying rigid pipe. Additionally, the length of a flexible pipe makes it difficult to manage and its length cannot easily be modified: it can only be shortened.

Also, flexible pipe tends to be fragile: its structure and particularly its important tensile layer has failure modes such as unlocking or disbondment. The outer sheath of the pipe is also fragile and has to be handled with care. Like a wire, failure of part of the pipe may condemn the whole pipe. There is also a tendency to twist because of unbalanced armour layers in torsion.

WO 2012/168702 to Flexlife discloses a contact damage protector for a flexible marine riser. The protector is made up of sleeve elements connected together to form a sleeve. Each sleeve element has a male section at one end and a female section at the other end, such that the male section of one sleeve element is received within a female section of the next sleeve element and so on. However, the sleeve elements are not suitable for use as sling sections for abandonment or recovery.

It is against this background that the present invention has been devised.

BRIEF SUMMARY OF THE INVENTION

In one sense, the invention resides in methods of abandonment and recovery during subsea pipelaying using a pipelay vessel.

A method of abandoning a pipeline in accordance with the invention comprises: coupling the top of a pipe string directly or indirectly to a lower tendon element of an abandonment string; suspending the pipe string from the lower tendon element; releasably engaging further tendon elements in succession to an upper end of the abandonment string while lowering the pipe string into the sea, such that the pipe string and the abandonment string are in end-to-end alignment under tension along a launch axis under the weight load of the pipe string; lowering the top of the pipe string to a handover depth; at the handover depth, applying tensile force via a wire from the vessel to the top of the pipe string, the wire being at an acute angle to the launch axis; by application of tensile force via the wire, deflecting the pipe string from the launch axis toward end-to-end axial alignment with the wire to transfer the weight load of the pipe string to the wire; and decoupling the abandonment string from the pipe string.

Conveniently, the wire is attached to the top of the pipe string at the surface and is lowered with the pipe string to the handover depth.

It is preferred that the abandonment string bears substantially the whole weight load of the pipe string during lowering to the handover depth.

A link element may be coupled to the top of the pipe string, in which case the pipe string may be suspended from a lower tendon element of the abandonment string via the link element. This allows the pipe string, the link element and the abandonment string to lie in end-to-end alignment under tension along the launch axis under the weight load of the pipe string. Angular movement of the link element with respect to the abandonment string and the pipe string may then be accommodated by deflection of the pipe string from the launch axis toward alignment with the wire. For example, the link element may move angularly with respect to the abandonment string and the pipe string by pivoting about upper and lower couplings of the link element, or by flexing.

The abandonment method of the invention is suitably followed by raising and dissembling the abandonment string by removing tendon elements in succession from the top of the abandonment string on the pipelay vessel.

Within the inventive concept, a corresponding method of recovering a pipeline in accordance with the invention comprises: using a wire from the vessel to raise the top of the pipe string to a handover depth while the wire and the pipe string are in end to end alignment on a lift axis; releasably engaging tendon elements in succession to an upper end of a recovery string of such elements to lower the recovery string to the handover depth; at the handover depth, coupling the recovery string to the top of the pipe string; applying tensile force via the recovery string at an acute angle to the lift axis to deflect the pipe string from the lift axis toward end-to-end axial alignment with the recovery string to transfer the weight load of the pipe string to the recovery string; and raising the pipe string from the handover depth toward the surface by raising the recovery string while dissembling tendon elements from the recovery string.

In the context of recovery, it is convenient for the wire to be raised with the pipe string from the handover depth and to be detached from the top of the pipe string at the surface. Again, the recovery string suitably bears substantially the whole weight load of the pipe string during raising from the handover depth.

A link element may be attached to the top of the pipe string so as to accommodate deflection of the pipe string from the lift axis toward alignment with the recovery string by angular movement of the link element with respect to the recovery string and the pipe string. The pipe string may be suspended from a lower tendon element of the recovery string via the link element such that the pipe string, the link element and the recovery string are in end-to-end axial alignment under tension under the weight load of the pipe string. Again, the link element may pivot about the upper and lower couplings to achieve this, or it may flex.

The use of tendon elements in a discontinuous abandonment or recovery string in accordance with the invention is advantageous for various reasons. For example, the individual elements are easy to handle and to store on board a pipelaying vessel, where they may be stored horizontally in racks that are routinely provided on a pipelaying vessel configured for laying rigid pipe. The tendon elements do not give rise to twisting and they are less fragile than flexible pipe, with more predictable failure modes; even if one of the elements is damaged, it can be swapped out without discarding the other elements. Also, the length of the string may easily be adjusted by adding or subtracting tendon elements from the string.

Inventive content also resides in a tendon element cooperable with other tendon elements to form an abandonment or recovery string, the tendon element being elongate to define opposed ends, and comprising: complementary connector formations at respective ends, each connector formation being cooperable, in use when forming a string, with a complementary connector formation of a neighbouring tendon element in the string; a tensile load-bearing member extending between the connector formations; and at least one sleeve removably mounted around the load-bearing member.

Advantageously, the sleeve is arranged to be handled by pipe-joint handling apparatus associated with a J-lay tower of a pipelay vessel. The sleeve may be comprised of sleeve sections of generally part-circular cross-section that can be assembled together around the load-bearing member.

The load-bearing member preferably extends along a central longitudinal axis of the tendon element. For example, the sleeve may be coaxial with the load-bearing member in cross-section. Nevertheless, the load-bearing member may have an external hang-off formation shaped to engage with a hang-off clamp of a pipelay vessel; such a formation may be offset axially with respect to the sleeve.

The load-bearing member is suitably shaped to define at least one shoulder that locates the sleeve axially with respect to the load-bearing member. For example, the shoulder may be defined by an end of a recess in the load-bearing member that accommodates the sleeve.

A common inventive concept extends to an abandonment or recovery string comprising a plurality of tendon elements of the invention. The inventive concept also embraces a method of abandoning or recovering a pipeline during subsea pipelaying, comprising assembling an abandonment or recovery string from a plurality of tendon elements of the invention.

BRIEF DESCRIPTION OF THE SEVERAL VIEWS OF THE DRAWINGS

Reference has already been made to FIGS. 1 and 2 of the accompanying drawings to put the invention into context. In order that the invention may be more readily understood, reference will now be made, by way of example, to the remaining drawings in which:

FIG. 9 is a side view of a tendon element in accordance with the invention;

FIG. 10 is a fragmented side view of the tendon element shown in FIG. 9;

DETAILED DESCRIPTION OF THE INVENTION

Figure 1:
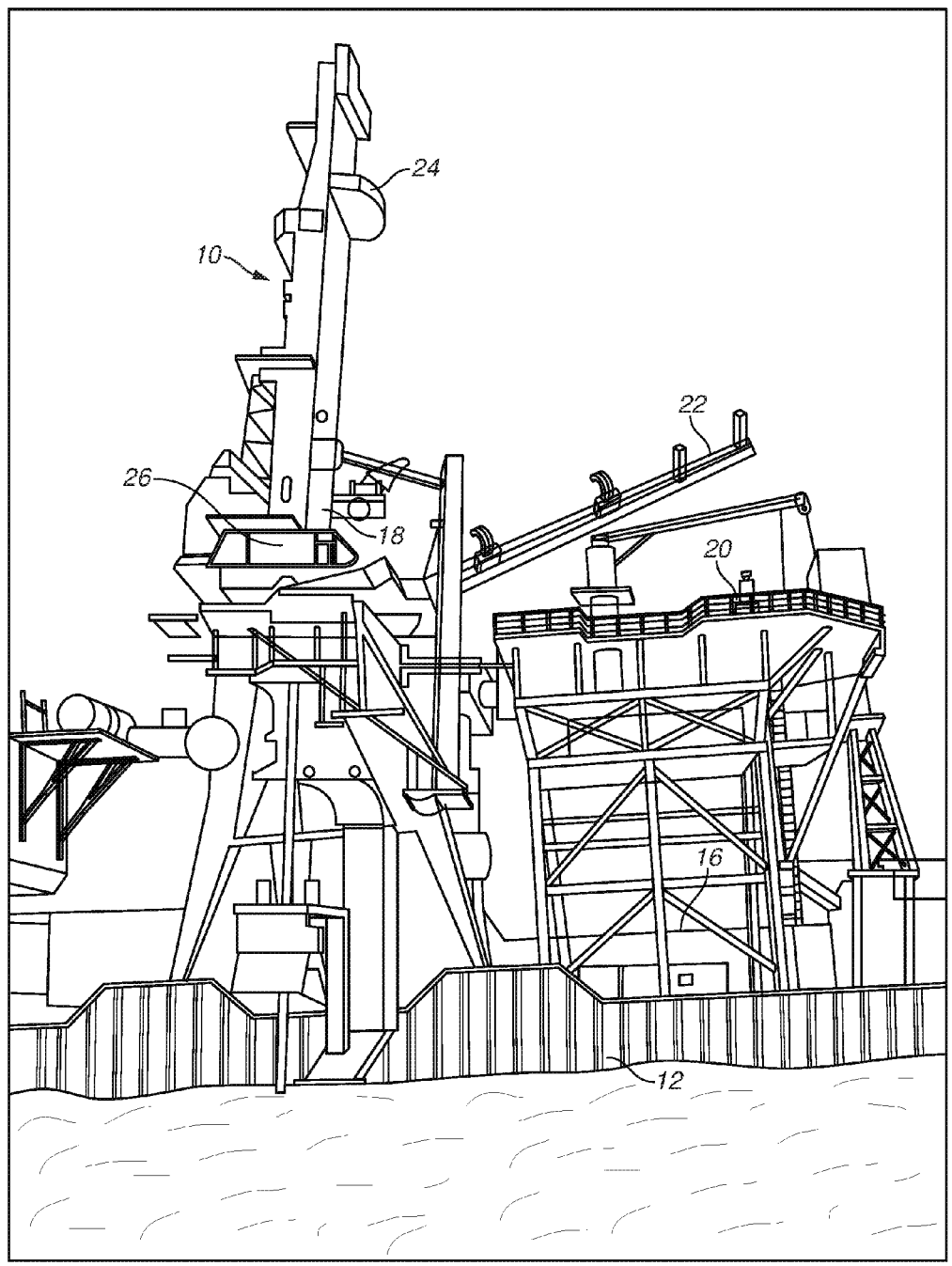
FIG. 1 is a side view of a J-Lay tower on a barge.

FIGS. 3 to 7 show a vessel 28 during an abandonment procedure. In this example, the vessel 28 is the Applicant's pipelay/heavy lift vessel Seven Borealis. Seven Borealis is fitted with a top tension J-lay system including a J-lay tower 30 that can gimbal up to 15° either side of vertical; the J-lay tower 30 is shown in FIGS. 3 to 6 inclined accordingly. Seven Borealis also has S-lay facilities, including a traction winch 32 of 600-tonne rating mounted on its deck 34 several meters from the J-lay tower 30.

Elongate tendon elements 36, which will be described later with reference to FIGS. 8 to 14 of the drawings, are stored horizontally on the deck 34 together with double joints of pipe made on shore.

Figure 2:
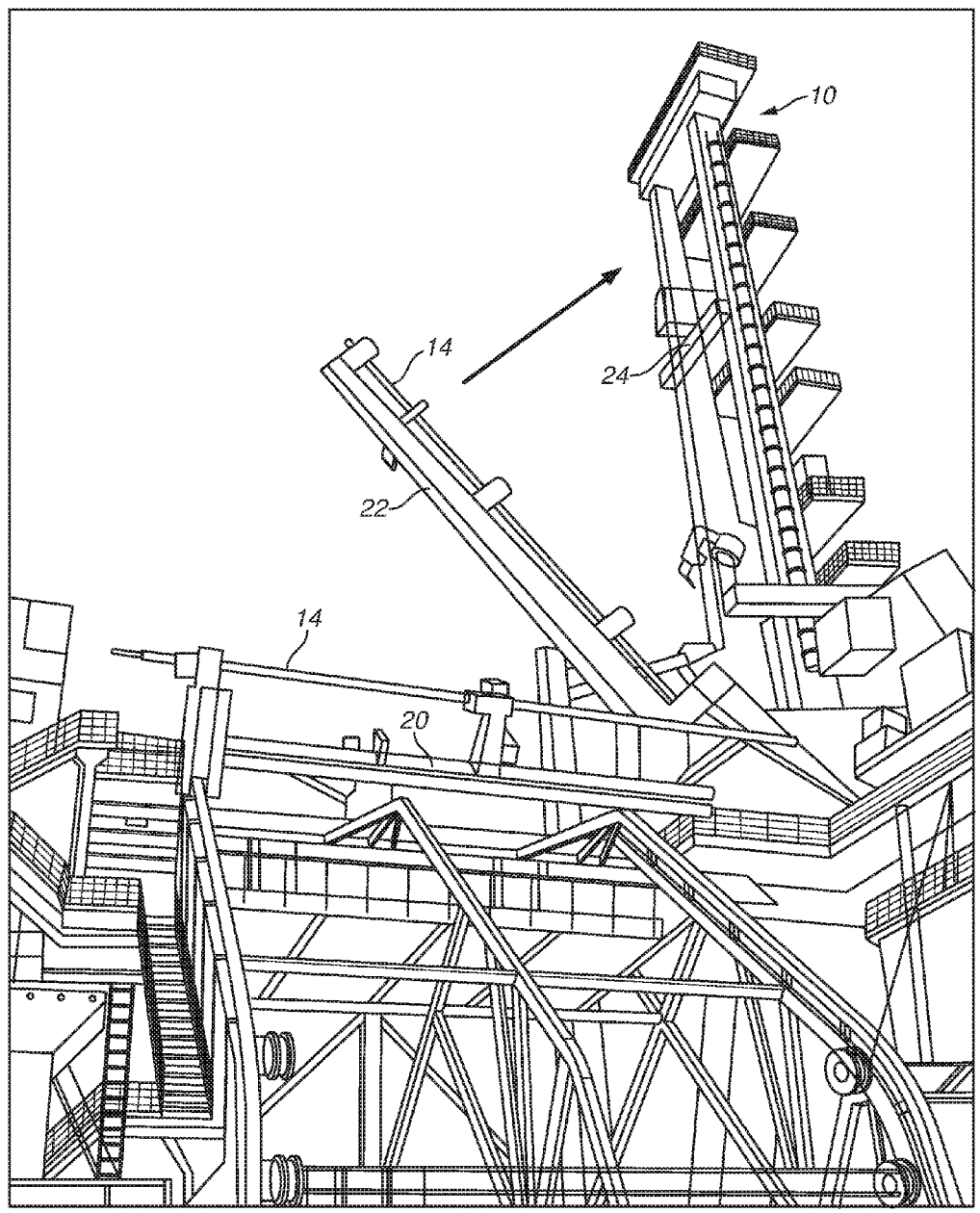
FIG. 2 is a perspective view of an erector arm loading a double joint into the tower of FIG. 1.

During a J-lay pipelaying operation as described already with reference to FIGS. 1 and 2 of the drawings, double joints of pipe are lifted successively from the deck 34 and upended into the J-lay tower 30 to be aligned with and welded to the pipeline end supported at the base of the tower 30. The resulting pipe string 38 is shown in FIGS. 3 to 7 in the process of abandonment.

Figure 3:
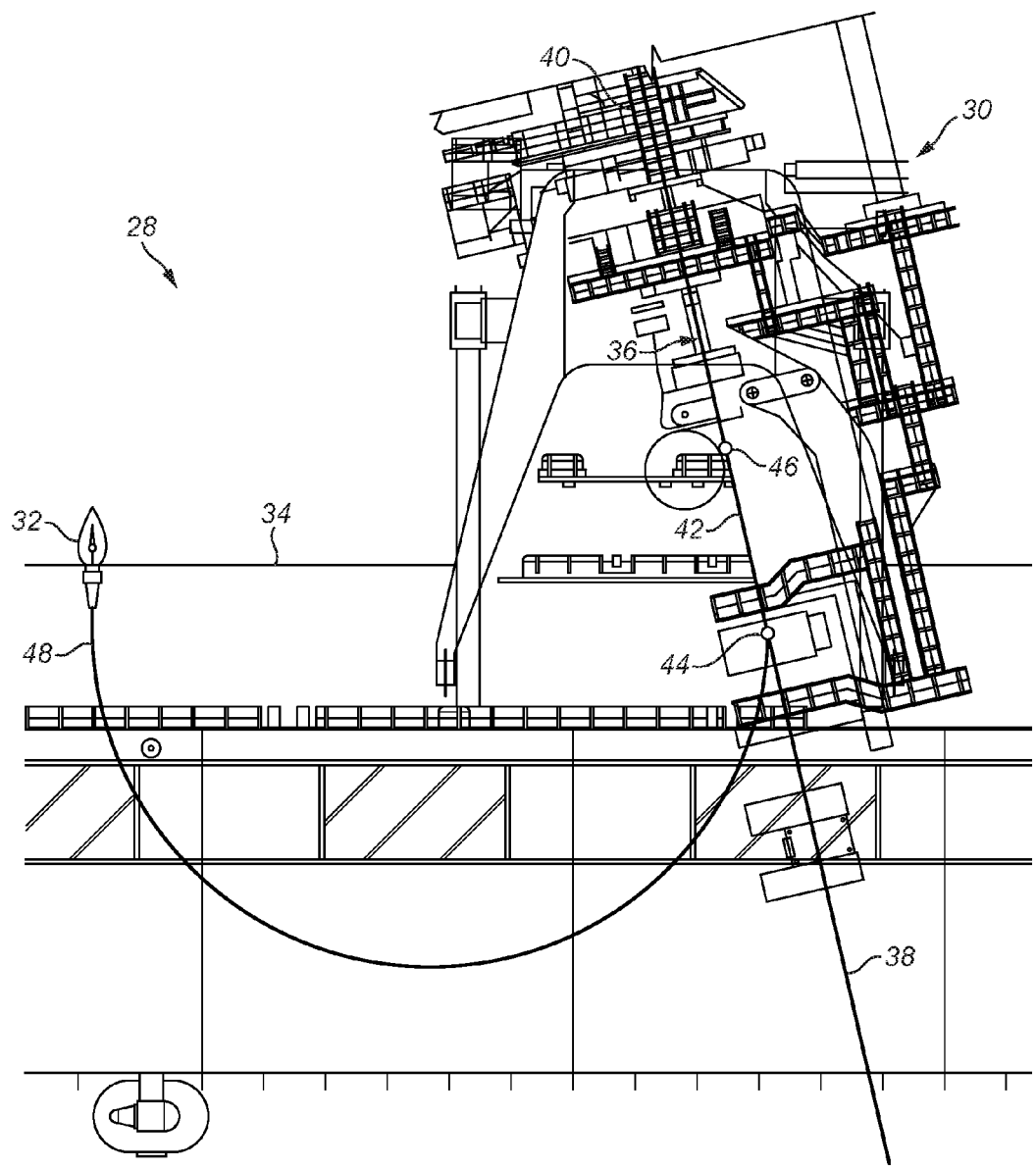
FIGS. 3 to 7 are side views of a pipelay vessel showing steps involved in an abandonment procedure in accordance with the invention.

FIG. 3 shows an early stage of the abandonment procedure. Here, a tendon element 36 has been lifted from the deck 34 to be supported by a tensioner 40 on the J-lay tower 30. A flexible synthetic grommet 42 of plastics rope has been coupled by a bottom coupling 44 to the top end of the pipe string 38 and by a top coupling 46 to the bottom end of the tendon element 36. The grommet 42 is under tension here to transmit the full weight load of the pipe string 38 to the tendon element 36 via the couplings 44, 46. Consequently, the tendon element 36, the grommet 42 and the upper portion of the pipe string 38 are in axial alignment at this stage.

An A&R wire 48 extends from the winch 32 over the side of the vessel 28 to join the grommet 42 at its bottom end, at or adjacent to the bottom coupling 44. The arrangement of the grommet 42, the A&R wire 48 and the couplings 44, 46 will be described in more detail later with reference to FIG. 8 of the drawings.

Figure 4:
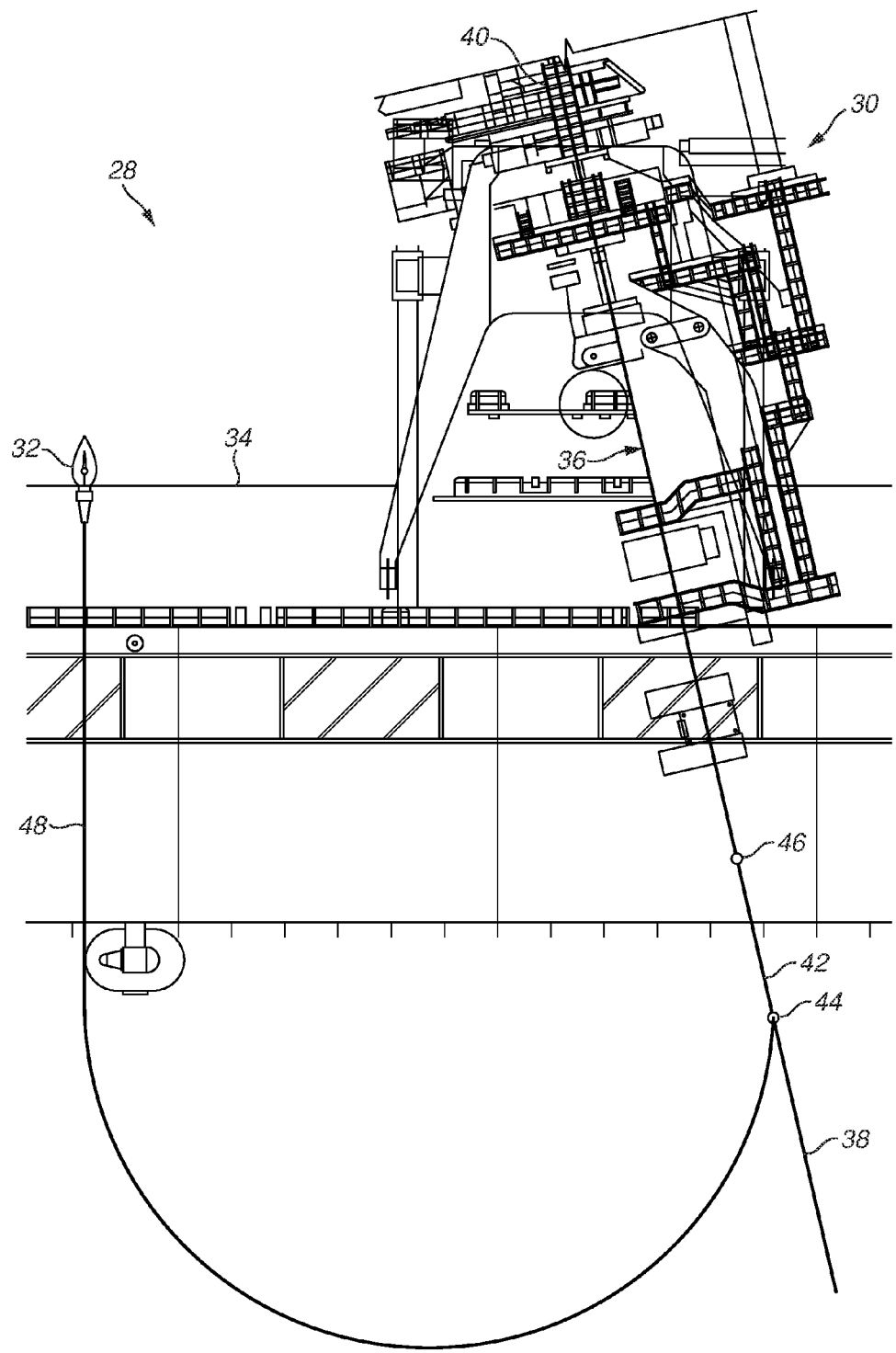

FIG. 4 shows the abandonment procedure underway, with an additional tendon element 36 having been lifted from the deck 34 to the J-lay tower 30 to be connected endwise to the top of the first, lowermost tendon element 36 already coupled to the grommet 42.

This starts the creation of an abandonment string comprising a plurality of tendon elements 36 connected successively end to end, such that the abandonment string lengthens with the addition of each successive tendon element 36 to the top. The abandonment string may be regarded as a tensile string made up of tensile elements. The tendon elements 36 of the abandonment string are handled and launched by the pipelay equipment of the J-lay tower 30 in much the same way as the pipe joints that make up the pipe string 38.

In this way, the top end of the pipe string 38 is lowered deeper into the sea with the addition of each successive tendon element 36 to the abandonment string. As it does so, the weight of the pipe string 38 hanging in the water column between the top end and the seabed progressively reduces. The tendon element 36, the grommet 42 and the upper portion of the pipe string 38 remain in axial alignment at this stage.

The A&R wire 48 is paid out from the winch 32 and hangs as a catenary as shown in FIGS. 3 and 4 until the top end of the pipe string 38 reaches a suitable handover depth below the sea surface but still significantly above the seabed. In one example, this depth may be in the region of 280 m although this depends upon the overall water depth and the pipeline characteristics. Here, the weight of the pipe string 38 hanging in the water column has reduced enough for the winch 32 to bear that weight load via the A&R wire 48.

When the top end of the pipe string 38 reaches the handover depth, the A&R wire 48 is tautened either by being wound onto the drum of the winch 32 or by continued downward movement of the pipe string 38 while the drum of the winch 32 is held stationary.

Figure 5:
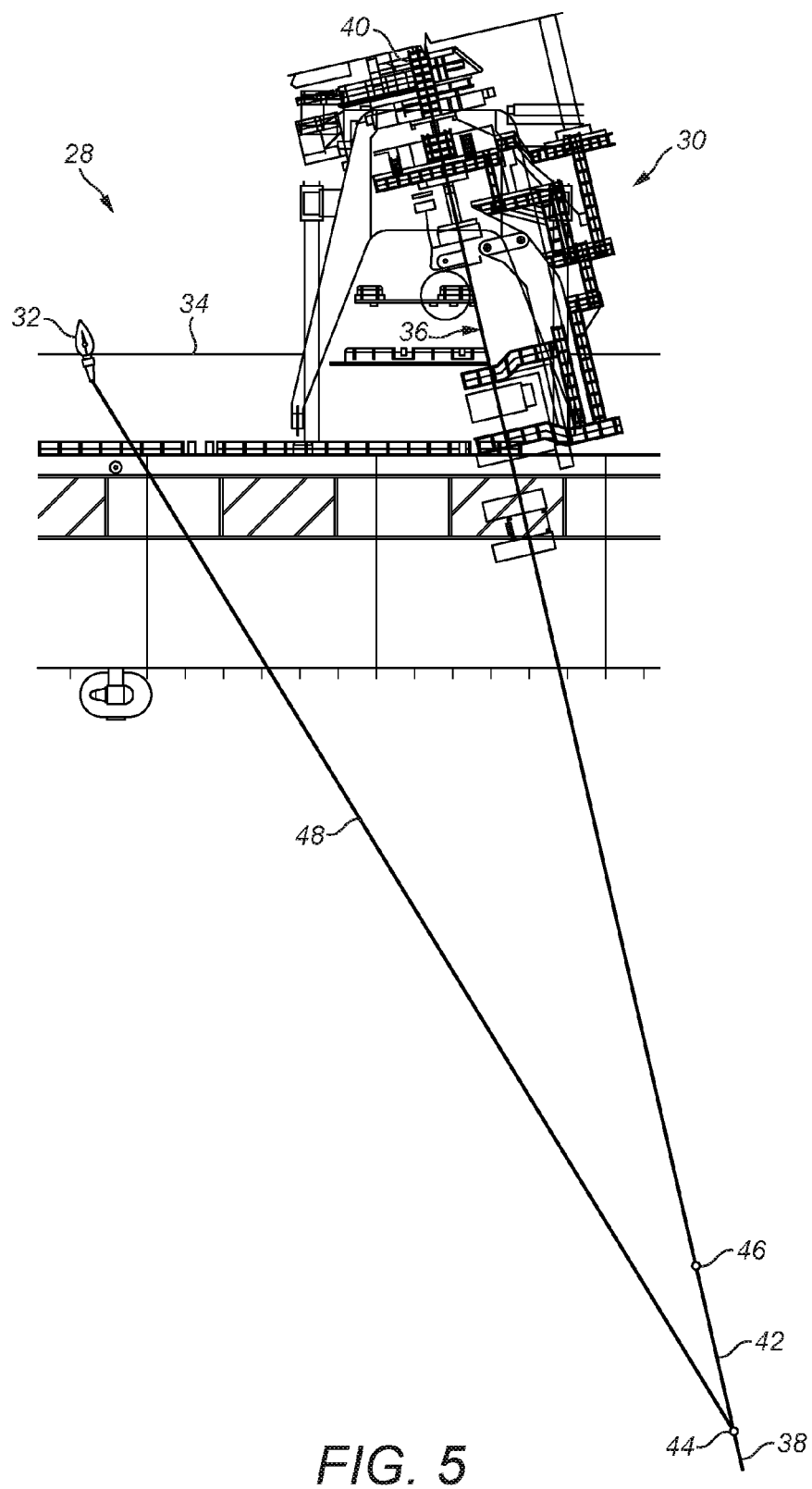
Figure 6:
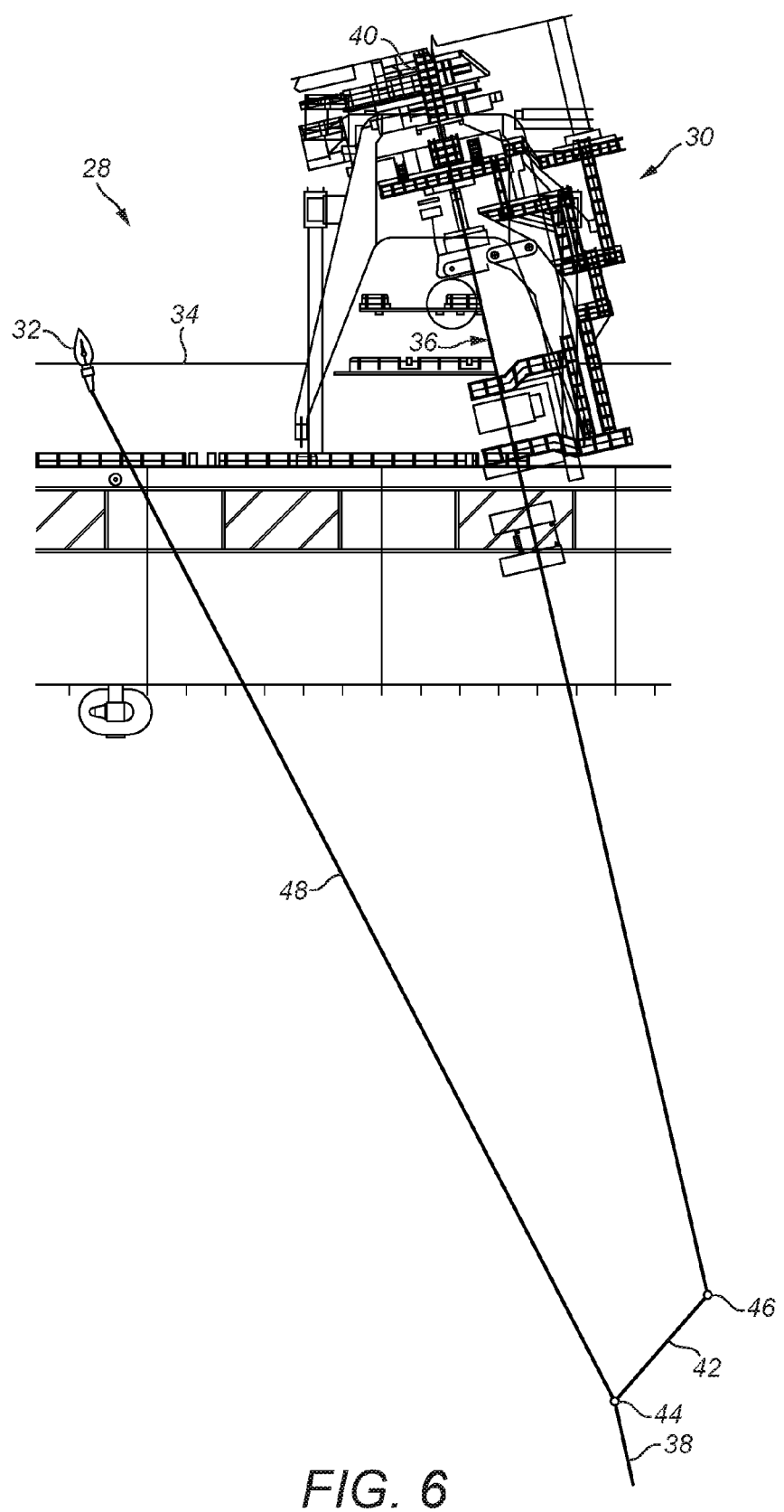

Initially, on tautening, the A&R wire 48 adopts an acute angle with respect to the common axis of the tendon element 36, the grommet 42 and the upper portion of the pipe string 38 as shown in FIG. 5. FIG. 6 shows the next step, in which the winch 32 pulls in the A&R wire 48 to pull the pipe string 38 toward axial alignment with the A&R wire 48.

It will be apparent from a comparison between FIGS. 5 and 6 that the grommet 42 serves as an articulated link between the abandonment string and the pipe string 38 to facilitate this lateral angular movement of the pipeline 38. This avoids bending the abandonment string, whose tendon elements 36 are substantially rigid and are connected inflexibly. The linkage function of the grommet 42 is enabled by its ability to pivot about the top and bottom couplings and/or by its intrinsic flexibility.

When the pipe string 38 and the A&R wire 48 are substantially in axial alignment, the load path extends from the pipe string 38 directly into the A&R wire 48, hence transferring the load of the pipe string 38 from the abandonment string to the A&R wire 48. It is then possible to decouple the bottom coupling 44 by remote actuation or by an ROV—if the handover depth is too deep for diver intervention to be practical—so as to detach the grommet 42 from the pipeline 38.

Figure 7:
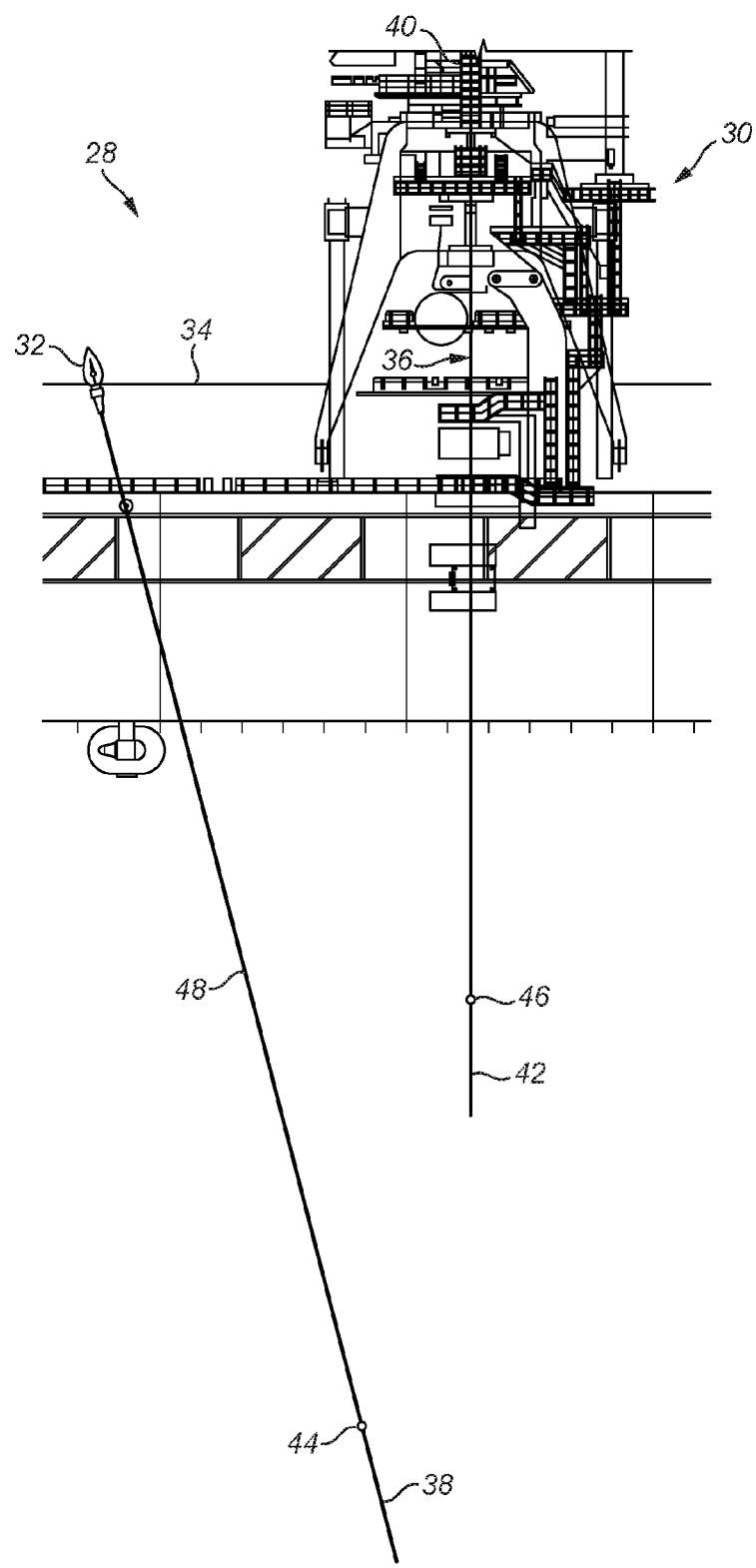

Once the grommet 42 has been detached from the pipeline 38 as shown in FIG. 7, the J-lay process is reversed to pull in the abandonment string with the grommet 42 hanging from the bottom of the lowermost tendon element 36. The J-lay tower 30 is shown here returned to the vertical. As the abandonment string is pulled in, the tendon elements 36 are detached successively from the top of the abandonment string in the J-lay tower 30 and lowered back onto the deck 34 of the vessel 28 to store them for re-use in a future abandonment procedure.

Recovery may involve a reverse process in which the A&R wire 48 hanging from the winch 32 lifts the top end of the pipe string 38 to a handover depth to meet a recovery string of tendon elements 36 assembled by, and lowered from, the J-lay tower 30. It will be evident that the recovery string is the same as the abandonment string: it is simply used for the opposite purpose.

A grommet 42 hanging from the end of the recovery string may be coupled by an ROV or other means to the top end of the pipe string 38. The recovery string may then be raised as described above, firstly to transfer the load of the pipe string 38 from the A&R wire 48 to the J-lay tower 30 via the recovery string and then to lift the top end of the pipe string 38 back to the surface, with increasing top tension that eventually exceeds the load capacity of the winch 32.

The A&R wire 48 may remain attached to the top of the pipe string 38 all the way to the surface although it can merely hang passively after the load of the pipe string 38 has been transferred to the recovery string at the handover depth.

Figure 8:
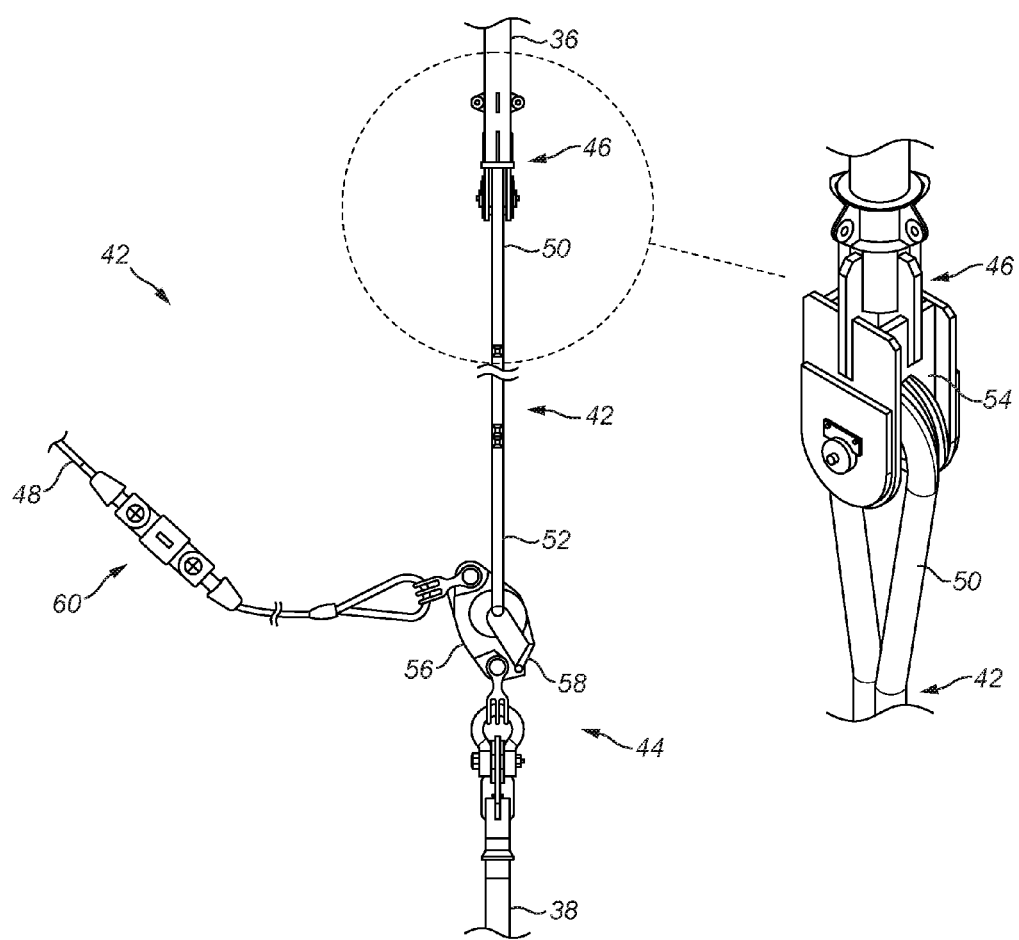
FIG. 8 is a side view of an abandonment head, grommet and A&R connection at a lower part of a tendon element in accordance with the invention, including an inset enlarged perspective view of a top coupling detail.
Figure 11:
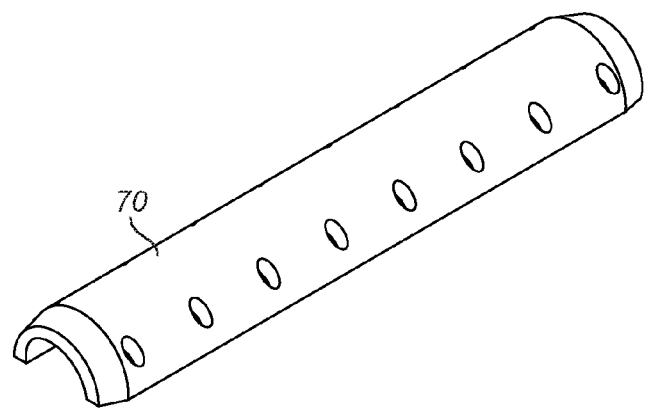
FIG. 11 is a perspective view of a gripping sleeve forming part of the tendon element shown in FIGS. 9 and 10.

FIG. 8 shows an exemplary arrangement of the grommet 42, the A&R wire 48 and the couplings 44, 46 in detail. The grommet 42 has looped terminations at its top and bottom ends, defining a top eye 50 and a bottom eye 52. The top eye 50 of the grommet 42 is shown in an enlarged inset view in FIG. 8 fixed permanently to a shackle 54 at the bottom end of the lowermost tendon element 36 to define the top coupling 46.

The bottom eye 52 of the grommet 42 is fixed releasably to a hook 56 at the top of the pipe string 38 to define the bottom coupling 44. A latch closure 58 prevents accidental release of the bottom eye 52 from the hook 56. The A&R wire 48 is fixed to the hook 56 by a releasable connector 60.

By connecting three parts of the system in this way, the hook 56 may be described as a 'delta plate'.

Moving on now to FIGS. 9 and 10, these show one of the tendon elements 36 in accordance with the invention. The tendon element 36 is an elongate tensile member that is typically 24 meters in length although other lengths are possible. At one end, the tendon element 36 terminates in a male connector 62, shown externally in FIG. 12 and in cross-sectional detail in FIG. 14. At the other end, the tendon element 36 terminates in a complementary female connector 64, also shown in cross-sectional detail in FIG. 14, for receiving the male connector 62 of an identical tendon element 36 in end-on engagement.

The male and female connectors 62, 64 cooperate with a quick action, in a manner best appreciated with reference to the later description of FIG. 14. They operate in a manner akin to the subsea connectors known for many years in the offshore industry and supplied, for example, by the GE business VetcoGray.

The connectors 62, 64 can be engaged quickly to assemble the abandonment string from successive tendon elements 36 and can be disengaged similarly quickly to disassemble the abandonment string. This minimises handling time and speeds the abandonment and recovery procedures, noting that time represents a great deal of money in offshore operations. In any event, it will be appreciated that abandonment should be performed as quickly as possible in the event that bad weather is approaching, whereas quick recovery allows the vessel 28 to resume pipelaying as quickly as possible. The result is to save significant critical path vessel time.

Much of the length of the tendon element 36 comprises a plain pipe section 66 welded to the female connector 64. Conversely, two longitudinally-spaced gripping sleeves 68 are offset toward the male connector 62, namely an outboard sleeve 68 adjoining the male connector 62 and an inboard sleeve 68 nearer the centre of the tendon element 36. Each gripping sleeve 68 comprises longitudinally-divided half-shells 70 of semi-circular cross-section bolted together at intervals along their length. One such half-shell 70 is shown in isolation in FIG. 11 of the drawings.

The gripping sleeves 68 provide an area for tensioner friction clamps to grip the tendon elements 36 as they pass through the J-lay tower 30. The gripping sleeves 68 are matched to the outer diameter of the project pipeline and so are project-specific; their replaceability allows the tendon elements 36 to be tailored for different projects and also to be maintained, as the half-shells 70 can easily be swapped out in the event of wear. By matching the outer diameter of the project pipeline, the gripping sleeves 68 ensure that there need be no downtime associated with tooling change-overs to reconfigure the J-lay tower 30 for A&R operations.

Figure 12:
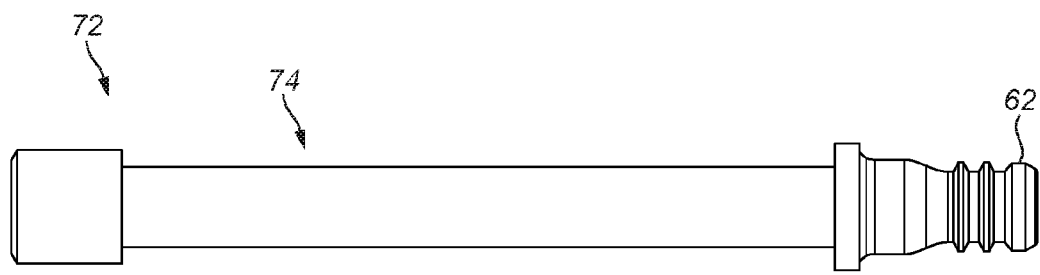
FIG. 12 is a perspective view of a pipe sleeve pup piece forming part of the tendon element shown in FIGS. 9 and 10.

The outboard gripping sleeve 68 adjoining the male connector 62 surrounds a male connector stub 72 shown in isolation in FIG. 12 of the drawings. The male connector stub 72 is a unitary tubular component through which axial load is transmitted when the tendon element 36 is in use. One end of the male connector stub 72 is shaped to define the male connector 62 as will be described. A recess 74 extends inboard from there along the male connector stub 72 to provide positive axial location for the two half-shells 70 of the outboard gripping sleeve 68.

Figure 13:
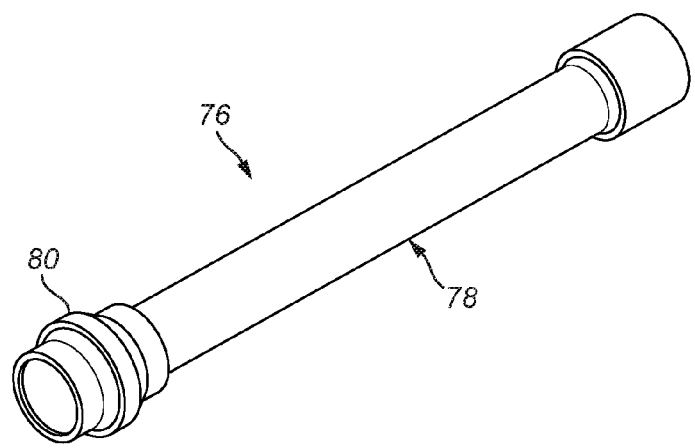
FIG. 13 is a side view of a male connector stub forming part of the tendon element shown in FIGS. 9 and 10.

The inboard gripping sleeve 68 surrounds a pipe sleeve pup piece 76 as shown in isolation in FIG. 13 of the drawings. This, too, has a recess 78 extending along its length between enlarged ends to provide positive axial location for the two half-shells 70 of the outboard gripping sleeve 68. The enlarged inboard end of the pipe sleeve pup piece 76 incorporates a hang-off collar 80.

Figure 14:
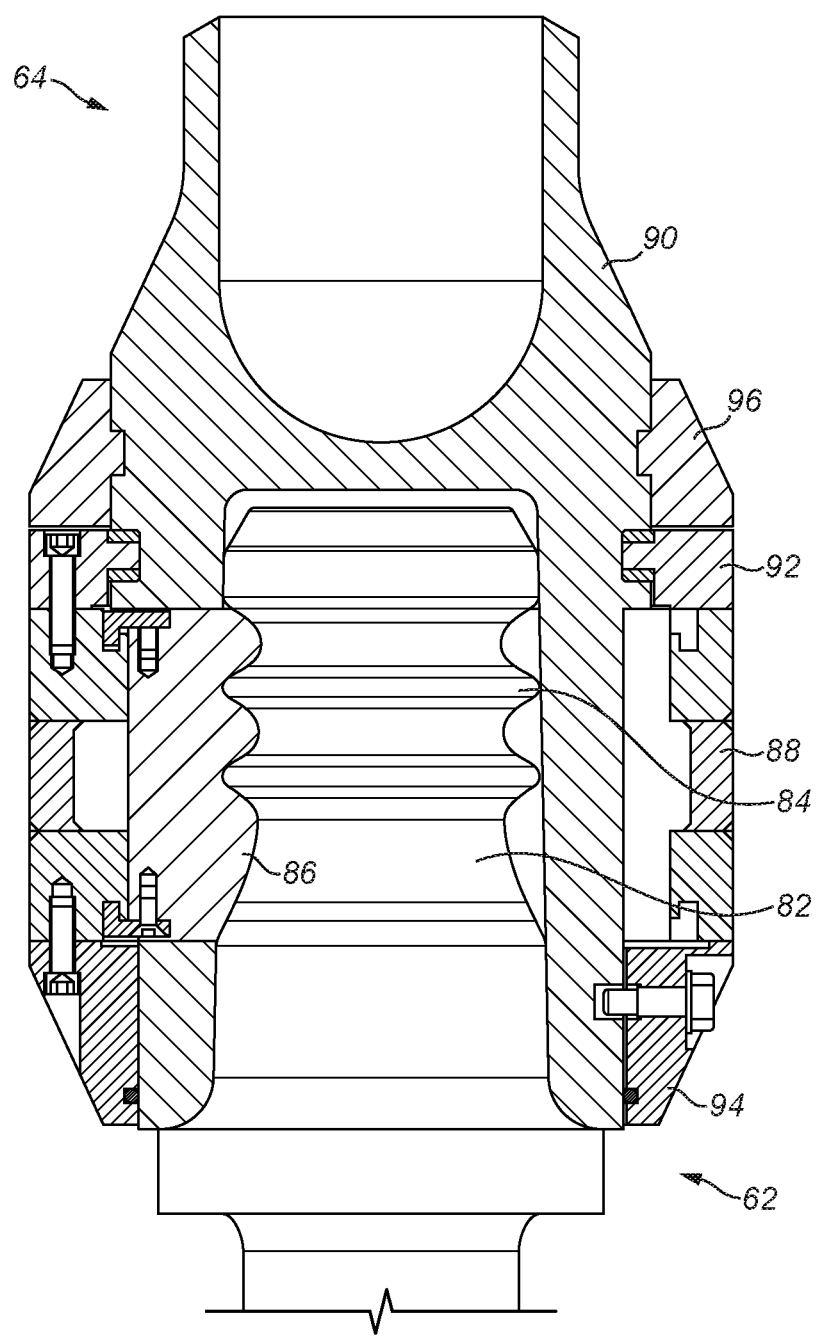
FIG. 14 is a side view in central longitudinal section of a female connector of a tendon element as shown in FIGS. 9 and 10, engaged with a male connector of a similar tendon element connected in axial succession.

Turning finally to FIG. 14—and as FIG. 12 also shows—the male connector 62 comprises a stud 82 of circular cross section extending along the central longitudinal axis of the tendon element 36. That stud 82 is encircled by spaced circumferential ridges 84 lying in planes perpendicular to the central longitudinal axis.

FIG. 14 also shows that the female connector 64 has a recess that lies on the central longitudinal axis of the tendon element 36 and that is complementary to the stud 82 of the male connector 62. Three locking dogs 86 with ridged formations complementary to the ridges of the stud 82 are spaced equi-angularly around the recess. The locking dogs 86 are movable radially in response to rotary circumferential movement of a locking ring 88. The locking ring 88 holds the locking dogs 86 captive in the assembly and resists radial loads. Rotation of the locking ring 88 in opposite angular directions engages and disengages the locking dogs 86. The assembly can be locked by securing the locking ring 88 to resist rotation.

Specifically, the locking ring 88 is turned around the female connector 64 in one direction to interact in a cam-like manner with the locking dogs 86 to lock the coupling as required. A quarter turn of the locking ring 88 is sufficient to lock together the male and female connectors 62, 64 in the way. Retracting links couple the locking dogs 86 to the locking ring 88 to retract the dogs 86 so as to release the connectors 62, 64 when the locking ring 88 is turned in the opposite direction.

A body component 90 of the female connector 64 is welded to the pipe section 66 of the tendon element 36. The body component 90 supports moving parts including the locking dogs 86 and locking collar 88 and defines the recess that embraces the machined stud 82 of the male connector 62. In use, the body component 90 transmits axial loads from the locking dogs 86 to the pipe 66 of the tendon element 36.

Upper and lower centralising rings 92, 94 sandwich the locking ring 88 to centralise it axially and to support its weight. It will be seen that the lower centralising ring 94 is externally tapered with a frusto-conical surface to help the connector assembly to roll on pipe conveyors and through roller boxes in pipe handling equipment of the vessel 28. An upper fairing ring 96 is similarly but oppositely tapered for the same purpose.

The many benefits of the connector arrangement described above include:
- ease of engagement, as the male connector simply stabs into the female connector;
- ease of locking and unlocking once the connectors have engaged;
- a compact design having no sharp or protruding edges, making it suitable for, and friendly to, rigid and flex-lay equipment;
- easily scalable to any size or shape depending on the application;
- an extremely strong design that can easily be scaled up or down;
- based on a successful drill connector, namely the H4 connector known since 1964; and
- much lower cost than comparable connectors.

The connector arrangement requires only a small force to be applied to lock or unlock it. If performed underwater, this is suitable for diver operation and is also within the capabilities of standard ROVs. If required, however, the force required to operate the connector arrangement could be reduced by adding a torque device such as a rack and pinion design to make the connector more ROV-friendly.

Another advantage of the invention is that if a tendon element is damaged, only that one tendon element need be rejected and replaced with another tendon element at reduced cost. The cost of emergency spares carried on board the pipelaying vessel is also reduced.

Many other variations are possible within the inventive concept. For example, an abandonment string made up of the tendon elements of the invention could be used to abandon and recover a pipeline all the way to and from the seabed.

The solutions of the invention could easily be scaled to produce a whole series of connectors suitable for alternative solutions. With a range of differing capacity connectors, connectors may be combined and selected to suit reducing capacity as top tension decreases. For example, it may only require four or five high-capacity connectors before top tensions and water depths are such that that it would be possible to switch to smaller, lower capacity variants. With potential top tensions of around 1400 tonnes already being discussed, the huge cost of A&R winches with such capacity makes the tendon element concept of the invention an attractive alternative.

The invention claimed is:

1. A method of abandoning a pipeline during subsea pipelaying from a pipelay vessel, the method comprising:
   coupling the top of a pipe string indirectly to a lower tendon element of an abandonment string;
   suspending the pipe string from the lower tendon element;
   releasably engaging further tendon elements in succession to an upper end of the abandonment string while lowering the pipe string into the sea, such that the pipe string and the abandonment string are in end-to-end alignment under tension along a launch axis under the weight load of the pipe string;
   lowering the top of the pipe string to a handover depth;
   at the handover depth, applying tensile force via a wire from the vessel to the top of the pipe string, the wire being at an acute angle to the launch axis;
   by application of tensile force via the wire, deflecting the pipe string from the launch axis toward end-to-end axial alignment with the wire to transfer the weight load of the pipe string to the wire; and
   decoupling the abandonment string from the pipe string.

2. The method of claim 1, wherein the wire is attached to the top of the pipe string at the surface and is lowered with the pipe string to the handover depth.

3. The method of claim 1, wherein the abandonment string bears substantially the whole weight load of the pipe string during lowering to the handover depth.

4. The method of claim 1, comprising:
   coupling a link element to the top of the pipe string;
   suspending the pipe string from the lower tendon element of the abandonment string via the link element, such that the pipe string, the link element and the abandonment string are in end-to-end alignment under tension along the launch axis under the weight load of the pipe string; and
   accommodating deflection of the pipe string from the launch axis toward alignment with the wire by angular movement of the link element with respect to the abandonment string and the pipe string.

5. The method of claim 4, wherein the link element moves angularly with respect to the abandonment string and the pipe string by pivoting about upper and lower couplings of the link element.

6. The method of claim 4, wherein the link element moves angularly with respect to the abandonment string and the pipe string by flexing.

7. The method of claim 1, followed by raising and dissembling the abandonment string by removing tendon elements in succession from the top of the abandonment string on the pipelay vessel.

8. A method of recovering a pipeline for subsea pipelaying from a pipelay vessel, the method comprising:
   using a wire from the vessel to raise the top of the pipe string to a handover depth while the wire and the pipe string are in end to end alignment on a lift axis;
   releasably engaging tendon elements in succession to an upper end of a recovery string of such elements to lower the recovery string to the handover depth;
   at the handover depth, coupling the recovery string to the top of the pipe string;
   applying tensile force via the recovery string at an acute angle to the lift axis to deflect the pipe string from the lift axis toward end-to-end axial alignment with the recovery string to transfer the weight load of the pipe string to the recovery string; and
   raising the pipe string from the handover depth toward the surface by raising the recovery string while dissembling tendon elements from the recovery string.

9. The method of claim 8, wherein the wire is raised with the pipe string from the handover depth and is detached from the top of the pipe string at the surface.

10. The method of claim 8, wherein the recovery string bears substantially the whole weight load of the pipe string during raising from the handover depth.

11. The method of claim 8, comprising:
   coupling a link element to the top of the pipe string;
   coupling a lower tendon element of the recovery string to the top of the pipe string via the link element:
   accommodating deflection of the pipe string from the lift axis toward alignment with the recovery string by angular movement of the link element with respect to the recovery string and the pipe string; and
   suspending the pipe string from the lower tendon element of the recovery string via the link element such that the pipe string, the link element and the recovery string are in end-to-end axial alignment under tension under the weight load of the pipe string.

12. The method of claim 11, wherein the link element moves angularly with respect to the recovery string and the pipe string by pivoting about upper and lower couplings of the link element.

13. The method of claim 11, wherein the link element moves angularly with respect to the recovery string and the pipe string by flexing.

* * * * *